United States Patent [19]

Tuin

[11] 4,450,118
[45] May 22, 1984

[54] APPARATUS FOR SATURATING A GAS WITH THE VAPOR OF A LIQUID

[75] Inventor: Hermanus N. Tuin, Eindhoven, Netherlands

[73] Assignee: U.S. Philips Corporation, New York, N.Y.

[21] Appl. No.: 369,790

[22] Filed: Apr. 19, 1982

[30] Foreign Application Priority Data

Apr. 29, 1981 [NL] Netherlands ..................... 8102105

[51] Int. Cl.³ ............................................. B01F 3/04
[52] U.S. Cl. ..................................... 261/147; 261/22; 261/119 R; 261/121 R; 261/DIG. 65
[58] Field of Search ............... 261/22, 119 R, 121 R, 261/128, 146, 147, 142, DIG. 65; 55/223; 128/203.27; 65/3.12; 219/271–276

[56] References Cited

U.S. PATENT DOCUMENTS

| | | | |
|---|---|---|---|
| 1,608,251 | 11/1926 | Shook et al. | 261/22 |
| 3,434,471 | 3/1969 | Liston | 128/203.27 X |
| 3,615,079 | 10/1971 | De Lara et al. | 261/146 |
| 3,864,440 | 2/1975 | Giocoechea | 261/DIG. 65 |
| 4,051,205 | 9/1977 | Grant | 261/DIG. 65 |
| 4,140,735 | 2/1979 | Schumacher | 261/DIG. 65 |
| 4,206,745 | 6/1980 | Gilgen | 261/128 X |
| 4,276,243 | 6/1981 | Partus | 261/DIG. 65 |

Primary Examiner—Richard L. Chiesa
Attorney, Agent, or Firm—Norman N. Spain

[57] ABSTRACT

An apparatus for saturating a gas with the vapor of a liquid is formed by two chambers. In the first chamber the gas is passed through the liquid which has a higher temperature than the temperature at which the gas must ultimately have been saturated on leaving the apparatus. Thereafter, the gas is passed into a second chamber. The liquid in said chamber has the temperature at which the gas must be saturated.

2 Claims, 1 Drawing Figure

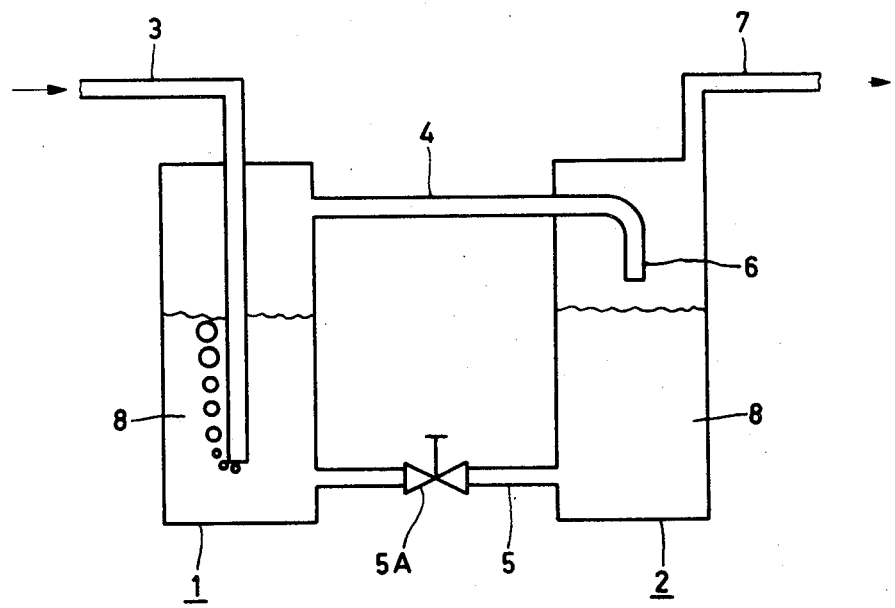

APPARATUS FOR SATURATING A GAS WITH THE VAPOR OF A LIQUID

The invention relates to an apparatus for saturating a gas with the vapour of a liquid, of the type wherein the gas is bubbled through the relevant liquid.

Apparatuses of this type are described in the literature. These apparatuses are used in, for example, the production of silicon dioxide from a halide, such as $SiCl_4$, and oxygen. If said production of silicon dioxide is a process step in the manufacture of an optical fibre, it is important to have the possibility of feeding oxygen or another carrier gas with a constant quantity of $SiCl_4$-vapour to the reaction chamber in which the reaction takes place, $SiO_2$ then being formed. Most preferably the supply of the $SiCl_4$-carrier gas mixture should be effected at a high rate, without any effect on the quantity of $SiCl_4$ supplied per unit of time to the reaction chamber. For example during the manufacture of optical fibres, the $SiCl_4$-carrier gas flow is often mixed in or before the reaction chamber with a constant quantity or with a quantity which increases or decreases as a function of time of a starting material for a substance which modifies the index of refraction of vitreous $SiO_2$. The manufacture of the core material of a stepped-index fibre or a graded-index fibre having a refractive index gradient could be mentioned as an example.

In an arrangement in which a carrier gas, for example oxygen, is bubbled through a liquid, for example $SiCl_4$ which is kept at a constant temperature, the ratio of the liquid vapour to the carrier gas will generally have the tendency to decrease when the rate at which the carrier gas is passed through the liquid is increased.

If the liquid is rather volatile at the operating temperature (that is has a high vapour pressure) the liquid may cool when the flow rate of the carrier gas is increased, as a result of which the evaporation no longer occurs at a constant temperature. This may also change the ratio of the vapour of the liquid to the carrier gas in an uncontrollable and unwanted manner. In addition, the period of time in which the liquid and the gas are in contact may be too short to result in saturation.

There are apparatuses in which the carrier gas skims over the surface of the liquid. Although some of the disadvantages which may be met with bubbling arrangements do not occur in these apparatuses, an uncontrollable change may occur in the liquid vapour/carrier gas ratio. It is an object of the invention to provide an apparatus of the type in which the gas is bubbled through the liquid which is suitable for high gas flow rates. According to the invention, an arrangement of this type is characterized in that the apparatus is formed by two interconnected chambers which during operation contain the liquid, the first chamber having a gas inlet pipe which ends below the surface level of the liquid which during operation is present in said chamber and is kept at a temperature which is higher than the temperature at which the gas must be saturated with the vapour of said liquid, and said chamber being connected by means of a gas pipe to the second chamber in which during operation the liquid is kept at the temperature at which the gas must be saturated, through which connecting gas pipe the gas which during operation has been bubbled through the liquid in the first chamber is contacted in the second chamber with the liquid contained in said chamber before the gas leaves the arrangement.

When the apparatus is in operation, the carrier gas in the first chamber is contacted with the liquid at a temperature which is higher than ultimately required, thereafter the carrier gas is contacted in the second chamber with liquid which is at the desired temperature. A portion of the liquid vapour in the carrier gas then condenses and the gas flowing from the second chamber comprises thereafter so much of the vapour of the liquid as corresponds to the partial pressure at the temperature of the liquid in the second chamber. Since on condensation of the liquid latent heat of evaporation is released, it will in certain circumstances be necessary to cool the second chamber to the desired temperature. As vapour of the liquid always condenses in the second chamber and consequently the quantity of liquid in said chamber increases, the first chamber is furthermore connected in a preferred embodiment of the arrangement to the second chamber by means of a closable connecting pipe which ends in both chambers in a place which during operation is located below the surface level of the liquid.

In accordance with a preferred embodiment of the invention, the second chamber is of such a construction that therein the gas skims over the liquid. It is however alternatively possible to have the gas bubble through the liquid, but then there is the risk that drops of liquid are carried along from the chamber.

An embodiment of an apparatus in accordance with the invention and a method of saturating a gas with the vapour of a liquid will now be further described by way of non-limitative example with reference to the accompanying drawing.

The sole FIGURE of the drawing shows schematically an apparatus in accordance with the invention.

In principle, the apparatus is formed from two closed chambers 1 and 2 which each contain a liquid 8. A gas which enters through the pipe 3 must be saturated at a temperature T with the vapour of this liquid 8. For that purpose the liquid 8 in chamber 1 is at a temperature of $(T+\Delta T)$. A suitable temperature difference $\Delta T$ may be, for example, 25 to 100 Celsius degrees depending on the volatility of the liquid 8. The temperature $(T+\Delta T)$ must of course be lower than the boiling point of the liquid. From chamber 1 the carrier gas flows through the connecting pipe 4 and the pipe 6 over the liquid 8 present in chamber 2. In said chamber the liquid 8 is kept at a temperature T. On being contacted with the liquid 8 in chamber 2, the concentration of the vapour of the liquid in the carrier gas decreases by condensation to the partial pressure of the vapour which corresponds to that of the liquid 8 at a temperature T. The carrier gas with liquid vapour leaves the chamber 2 through the pipe 7. It is advantageous to keep the subsequent connecting pipe to the reaction chamber, not shown, at a temperature which is some degrees higher than T. As a result thereof, no condensation of the vapour of the liquid can occur in said pipe. The two chambers 1 and 2 are interconnected by a connecting pipe 5 which has a valve 5A so that in spite of condensation of vapour of the liquid in chamber 2 the liquid levels in the two chambers can be made equal with the aid of said valve. In practice the chambers include heating devices and temperature sensors, so that the temperatures can be kept constant to the best possible extent.

In certain circumstances it may be necessary to discharge heat from the chamber 2 via a cooling device. As the gas in the second chamber gives up heat to the liquid, an increase of the gas flow rate cannot result in a decrease of the temperature of the liquid.

In a practical case liquid 8 consisted of SiCl$_4$. The temperature (T+ΔT) in chamber 1 was kept at 80° C. and the temperature T in chamber 2 was kept at 32° C. The connecting pipe 7 to the reaction chamber was kept at 35° C. Oxygen was passed through the arrangement. An increasing gas flow rate up to 2500 sccm appeared to have no influence on the concentration of liquid vapour in the gas stream leaving chamber 2. (a sccm is understood to mean a flow rate of one cm$^3$ per minute in standard conditions (0° C., 1 Bar)).

What is claimed is:

1. An apparatus for saturating a gas with a liquid vapor of the type wherein the gas is bubbled through the liquid characterized in that said apparatus comprises:
   (a) a first liquid holding chamber containing a first portion of said liquid maintained at a temperature above the saturation temperature of said gas for said vapor of said liquid,
   (b) a gas inlet means having an outlet end located below the surface of said first portion of said liquid for bubbling said gas into said first portion of said liquid,
   (c) a second liquid holding chamber containing a second portion of said liquid maintained at the saturation temperature of said gas for said vapor of said liquid,
   (d) a gas conduit means connecting said first liquid holding chamber to said second liquid holding chamber the inlet of said gas conduit means being located in said first said liquid holding chamber above the surface of said first portion of said liquid and the outlet of said gas conduit means being located in said second liquid holding chamber above the surface of said second portion of said liquid.

2. The apparatus of claim 1 wherein said first liquid holding chamber is connected to said second liquid holding chamber additionally through a liquid conduit means having an inlet in said first liquid holding chamber situated below the surface of said first portion of said liquid and an outlet in said second liquid holding chamber situated below the surface of said second portion of said liquid, said liquid conduit means being provided with liquid flow interruption means.

* * * * *